United States Patent [19]

Otsu et al.

[11] Patent Number: 4,477,599

[45] Date of Patent: Oct. 16, 1984

[54] METHOD OF PREPARING A LOW DENSITY, NONFLAMMABLE POLYVINYL FOAM COMPOSITION

[75] Inventors: Takayuki Otsu, Nara; Hirosuke Kojima, Owase, both of Japan

[73] Assignee: Hirosuke Kojima, Japan

[21] Appl. No.: 439,981

[22] Filed: Nov. 8, 1982

[30] Foreign Application Priority Data

Jul. 5, 1982 [JP] Japan .................................. 57-117100

[51] Int. Cl.$^3$ ................................................. C08J 9/00
[52] U.S. Cl. ........................................ 521/89; 521/73; 521/75; 521/93; 521/95; 521/134; 521/145
[58] Field of Search ...................... 521/73, 75, 145, 89, 521/95, 93, 134

[56] References Cited

U.S. PATENT DOCUMENTS

| | | | |
|---|---|---|---|
| 3,261,785 | 7/1966 | Robinson | 521/145 |
| 3,261,786 | 7/1966 | Breslow | 521/145 |
| 3,341,481 | 9/1967 | Palmer | 521/145 |

*Primary Examiner*—Morton Foelak
*Attorney, Agent, or Firm*—Cushman, Darby & Cushman

[57] ABSTRACT

A method of preparing a foamable polyvinyl system resin composition which renders a non-flammable, high strength to weight ratio foam product comprises, reacting at least 0.05 parts by weight of an organic radical initiator per 1 part by weight of polyvinyl system resin with the components consisting essentially of (a) at least one polyvinyl system resin (b) 2–100 parts by weight of at least one inorganic filler per 1 part by weight of polyvinyl system resin (c) an effective amount of at least one blowing agent.

3 Claims, No Drawings

METHOD OF PREPARING A LOW DENSITY, NONFLAMMABLE POLYVINYL FOAM COMPOSITION

BACKGROUND OF THE INVENTION

This invention relates to a method of preparing a polyvinyl foam composition, particularly to a method of preparing a polyvinyl foam composition that can render a low density, non flammable rigid foam.

It is known that polyvinyls resin, for example, polyvinyl chloride and its copolymers, have advantages in chemical resistance and flame resistance, and the foam products thereof are widely used for insulating material. However polyvinyl foams made in early days have disadvantages that they are liable to shrink and easily crack due to heat stress when they are employed at the extremely low temperature, such as, the temperatures of liquified nitrogen and liquified natural gas (LNG). Generally, polyvinyl rigid foams are produced, in a closed mold under high pressure, from a composition containing polyvinyl resin, filler, blowing agent, solvent and other additives. Improvements have appeared by developing formulation and processing technique thereof. It has been known that polyvinyl chloride resin is subject to heat degradation accompanied by emission of hydrogen chloride at the elevated processing temperature. Therefore it is desirable to reduce the resin content and increase the filler content to minimize the above defect as well as to improve the shrinkage resistance and flame resistance. In Japanese Pat. Nos. 46-2184, 52-26776, 53-7944, higher filler contents are used in the presence of a blowing agent, liquified butane, under specifically arranged condition, but from the compositions thereof, highly expanded or low density foams were not obtained. Likewise, in Japanese Pat. No. 56-129236, higher filler content is used in the presence of additional nitrile compound, such as acrylonitrile and the process is done in a usual way. It is also found that the foam produced therefrom does not render satisfactory properties of light weight and good mechanical strength.

SUMMARY OF THE INVENTION

An object of the present invention is to provide a method of preparing a foamable polyvinyl resin composition which can render a highly expanded and nonflammable rigid foam.

According to the present invention, a method of preparing a foamable polyvinyl system resin composition comprises, bringing the compounds including (a) at least one polyvinyl system resin (b) 2-100 parts by weight of at least one inorganic filler per 1 part of polyvinyl system resin (c) at least 0.05 part by weight of one radical initiator per 1 part of polyvinyl system resin (d) an effective amount of at least one blowing agent, and mixing them in the presence of a suitable solvent.

In the above described method, a relatively large amount of inorganic filler which are normally nonflammable and heat resistant are used as a main component and the polyvinyl system resin is used as a foam carrier. It is important that these amount of fillers should be completely and homogeneously dispersed or should be compatible with the polyvinyl system resin. Additionally, the blowing gas formed from the blowing agent should be kept enclosed during processing so as to effectively expand the reaction mixture to form a highly expanded product. The radical initiators used according to the invention provide a significant function to solve the above problems. The foam products formed thereby exhibit uniform independent foam texture, excellent dimensional stability, excellent flame resistance, low thermal conductivity and low linear expansion coefficient. The compressive strengths thereof are over 10 kg/cm$^2$ and the densities are less than 100 kg/m$^3$. Because of high content of fillers used, the products therefrom are relatively low cost.

It has been thought of the mechanism caused in the mixture due to the presence of such radical initiators as follow. During mixing operation the friction heat which may increase the temperature of the mixture up to 40° C.-60° C. makes the initiator decompose into free radicals. Presumably, these radicals extract the hydrogen atoms from the vinylpolymer chains which thereby become active due to the formation of free radical ends on the vinyl polymer. The activated vinyl polymer chains will then combine with initiator free radicals, forming many initiator radical segments along with the polymer chains. Also, these initiator free radicals may activate the polar groups of the filler molecules and combine with the filler molecules. The polymer chains with radical segments are more compatible with the fillers with radical segments when compared with the straight chain polymer. As the temperature is increased to the processing temperature of 140°-230° C. the activation of the initiator radicals appreciably increases and the filler and resin components may produce a more compatible composite. At this time the activated vinyl polymer is also likely to be melted more easily. This action may produce a tough skin of the vinyl polymer after being melted, to prevent the leakage of the blowing gas. Therefore, although large amount of fillers is added to a small amount of resin, it can be obtained not only a homogeneously dispersed mixture but also a tough skin of vinyl polymer which can effectively hold the blowing gas.

In an aspect of the invention, the resin component contains at least one member selected from the group including polyvinyl chloride, polyvinylidene chloride, copolymers of the polyvinyl chloride, copolymers of the polyvinylidene chloride and chlorinated polyethylene. Monomers for copolymerizing vinyl chloride and vinylidene chloride may contain ethylene, propylene, vinyl acetate, acrylic acid, acrylic acid ester, methacrylic acid, methacrylic acid ester, acrylonitrile, methacrylonitrile, sytrene, etc.

All fillers used for formulating the polyvinyl system resin composition heretofore are applicable to the present invention, for example, carbonates, sulfates, silicates, phosphates, borates, oxides and hydroxides of calcium, magnesium, aluminium, titanium, iron and zinc silica, silicate, anhydride talc, bentonite, clay, etc. These fillers can be used singly or in combination of two or more than two fillers. A wide range of particle sizes are workable for the use of the fillers. However, the particle sizes are preferably through 20 mesh sizes, more preferably, through 60 mesh sizes. In accordance with the invention, the content of the filler used is advantageously to be 2-100 part by weight of fillers per 1 part of polyvinyl system resin. If the filler content is less than 2 part by weight per 1 part by weight of the resin, it will not be obtained a desired nonflammable property. If the filler content is more than 100 part by weight per 1 part by weight of the resin, foam products of required low density may not be obtained.

The organic solvents used in this invention can be the solvents as usually applied in formulating polyvinyl system resin composition. They are aromatic hydrocarbon, such as benzene, toluene, ethylbenzene, xylene, chlorobenzene, etc., halogenated hydrocarbon, such as ethylene chloride, trichloroethane, carbon tetra chloride, etc., ketones, such as, acetone, methylethyl ketone, methylisobutyl ketone etc. These solvents can be used singly or in combination of two or more than two solvents. It is preferable that the solvent content is 30–80% by weight per total weight of polyvinyl system resin and fillers.

The blowing agents usable for the present invention can be those usually used in formulating polyvinyl resin foamable composition. Generally, the heat decomposable type are preferable, for example, organic blowing agents, such as, azodicarbonamide, N,N'-dinitrosopentamethylene tetramine, N,N'-dinitroso-N,N'-dimethylterephathalicamide, P-toluene sulfonylhydrazide, 4,4'-oxybisbenzenesulfonylhydrazide, benzene-1,3-disulfohydrazide, terephthalic azide etc., and inorganic blowing agents such as, sodium dicarbonate, ammonium chloride etc. These blowing agents can be used singly or in combination of two or more than two blowing agents.

The blowing agent is preferably used in an amount of 1–20 parts by weight per 100 parts of total weight of polyvinyl resin and fillers.

The radical initiator usable for the invention can be as follows:

(a) azo compounds, such as, azobisalkylnitrile

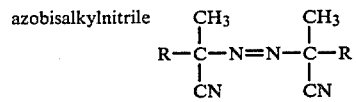

(wherein R represents low carbon number alkyl groups or low carbon number alkylcarboxyl groups);

azobiscyclohexylcarbonitrile

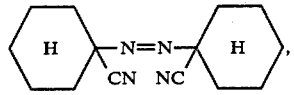

azobisester

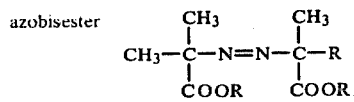

(wherein R is low carbon number alkyl group), hyponitrous acid ester

RO—N=N—OR, (wherein R is benzyl group or low carbon number alkyl group), phenylazotriphenylmethane

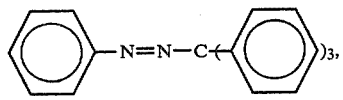

Phenylazothiophenylether

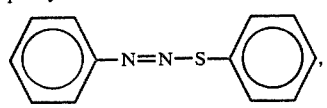

phenylazophenylamine

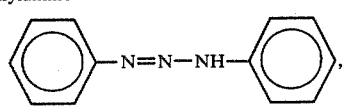

azobisbenzoyl

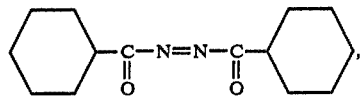

tetraalkyltetrazane

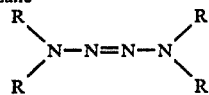

(wherein R represents low carbon number alkyl groups), 4,4'-azobis-4-cyano valeric acid

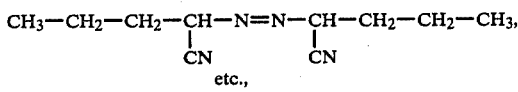
etc., (b) thiazole compounds, such as,

Dibenzothiazoledisulfide

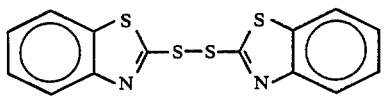

metal compound of 2-mercapto benzothiazole

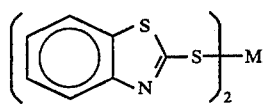

(wherein M represents Zn or Mg), (c) sulphenamide compounds, such as,

N—cyclohexyl-2-benzothiazolylsulphenamide

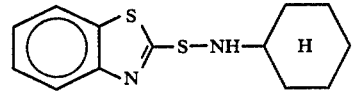

(d) thiuram compounds, such as, tetraalkylthiuramdisulfide

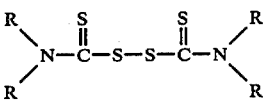

(wherein R represents low carbon number alkyl groups), (e) dithiocarbamic acid compounds, such as, metal derivatives of dialkyldithiocarbamic acid

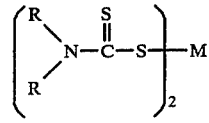

(wherein R represents low carbon number alkyl groups, and M represents Zn or Mg), The above radical initiators can be used singly or in combination of two or more than two initiators. They are preferably used in an amount of more than 5–10 parts by weight per 100 parts by weight of vinylpolymer. If the initiator content is less than 5 parts by weight per 100 parts by weight of polyvinyl system resin, the blowing gas will escape from the foaming materials. When the azo-system radical initiator is used together with a blowing agent which can provide the nitrogen gas, no other blowing agent is required to obtain an excellent foam.

The foamable polyvinyl system resin composition in the present invention, in addition, may contain reinforcing fibers, such as, glass fibers, asbestos, carbon fibers, boron fibers, metallic fibers etc., for enhancing the mechanical strength of the resultant products.

Besides the ingredients used as described above, other additives, such as urea-system foaming agents, ultraviolet absorbents, heat-stabilizers, anti-oxidents, organic fillers, dyes, pigments etc., may also be additionally used to obtain properties as required by the individual end uses.

The foamable polyvinyl system resin composition in the present invention can be prepared by a conventional blending procedure of the polyvinyl system resin composition. Usually, it is desirable that the above-mentioned components are uniformly dispersed in each other. This can be accomplished by mixing and homogenizing in a mixing apparatus, such as, a blender, supermixer, kneader or banbury mixer for several minutes, preferably for about 30–80 minutes. It is preferable that the organic solvent is added in part several times until the predetermined amount is completely used. Due to the friction heat caused during mixing, the temperature of the mixture is raised to 40°–60° C. and the radical initiators begin to decompose into free radicals which make the resin component and the filler component more compatible, thereby resulting a homogeneously dispersed mixture.

The blended mixture can be formed into a foam product which is nonflammable and has a density of less than 100 kg/m$^3$ and a compressive strength of 10 kg/cm$^2$. It can be made by firstly placing the blended mixture into a hot press or a transfer molding machine for about 30–80 minutes at the temperature of 140°–230° C. under the pressure of 50–150 kg/cm$^2$. At this condition the first stage expansion of the mixture will occur.

After completion of the first stage expansion the temperature has to be reduced up to below 10° C. by using the cooling water or cooling air. After cooling, the resultant first stage foamed product is taken out and then put into an oven with vat for further expansion under normal pressure and at the temperature of 90°–120° C. After 40–80 minutes the second stage expansion is finished and the final foamed product can be dried in a dryer to expel the residual organic solvents.

The following specific examples are presented for the purpose of clarifying the present invention. However, it should be understood that these are intended only to be examples of the present invention and are not intended to limit the present invention in any way.

EXAMPLE 1

| Components | Parts by weight |
| --- | --- |
| polyvinyl chloride resin | 100 |
| (for example, Nippon Zeon Co. "Zeon 121") | |
| silica powder | 150 |
| ZnO | 50 |
| Talc | 130 |
| Asbestos | 50 |
| Phenylazotriphenyl methane | 48 |
| P-toluene sulfonyl hydrazide | 10 |
| Xylene | 180 |
| Acetone | 100 |

Except the solvents xylene and acetone, all the above components were fed into a blender and blended for about 15 minutes. Then the amounts of the xylene and acetone were individually divided into two equal parts and the first parts of the xylene and acetone were gradually added into the blender for mixing with the other components. After 20 minutes, the remaining parts of the xylene and acetone were further added gradually. During mixing, the temperature of the mixture was increased to 50°–60° C. The blended mixture was then put into a hot press and pressurized up to 80 kg/cm$^2$ for 60 minutes at the temperature of 170° C. At this time the first stage expansion occured. The first stage expanded product was cooled for 80 minutes and then taken out from the hot press for the second stage expansion. The second stage expansion occured in an oven with vat at the temperature of 100° C. and under normal pressure. After 40 minutes the second stage expansion was complete. The expanded product was then taken into a dryer for about one or two days at 100° C. to expel residual organic solvents. The finished foamed products were cut into test specimens with required dimensions.

EXAMPLE 2

| Components | parts by weight |
| --- | --- |
| Vinyl chloride-vinylidene copolymer resin | 100 |
| (e.g. Asabi-Dow Co. "Salan") | |
| Calcium Carbonate | 230 |
| Titanium oxide | 50 |
| Tetramethylthiuramdisulfide | 28 |
| 4,4'oxybisbenzene sulfonyl hydrazide | 19 |
| Xylene | 180 |
| Acetone | 40 |

EXAMPLE 3

| Components | parts by weight |
| --- | --- |
| vinylchloride-vinylacetate copolymer resin | 100 |
| (e.g. DENKI KAGAKU CO. "Vinyl M-120") | |
| silicate anhydride | 120 |
| Talc | 100 |
| CaCO$_3$ | 200 |
| Azobiscyclohexylcarbonitrile | 24 |
| Azodicarbonamide | 10 |
| Xylene | 280 |

EXAMPLE 4

| Components | parts by weight |
| --- | --- |
| Polyvinyl chloride resin | 100 |
| (e.g. Sumitomo Kagaku Chemical Industry "PX-NK") | |
| CaCO$_3$ | 3500 |
| Talc powder | 2300 |
| TiO$_2$ | 1000 |
| Silicate anhydride | 850 |
| Azobisisobutylonitrile | 285 |
| N,N'dinitrosopentamethylene tetramine | 76 |
| Urea system foaming agent | 70 |
| (e.g. Sanky Kaseico. "CELLTON NP") | |
| Toluene | 3500 |
| Acetone | 850 |

In each of the Example 2 through Example 4 the procedures were carried out in the same way as described in the Example 1. It was found that the resultant specimens from Example 1 through Example 4 exhibit the properties as indicated in Table 1.

COMPARATIVE EXAMPLE

| Component | parts by weight |
|---|---|
| Polyvinyl chloride resin (e.g. Sumitomo Kagaku Chemical Industry "PX-NK") | 100 |
| Talc | 120 |
| CaCO$_3$ | 130 |
| Asbestos | 20 |
| N,N'dinitroso pentamethylene tetramine | 20 |
| Urea system foaming agent | 20 |
| Azodicarbonamide | 18 |
| Toluene | 220 |

In this example, the same procedure was also carried out as described in the example 1 and it was found that the first stage expansion did not occur as no radical initiator was used.

TABLE I

| Properties of test specimens | Example 1 | Example 2 | Example 3 | Example 4 |
|---|---|---|---|---|
| Density (kg/m$^3$) | 40 | 70 | 75 | 95 |
| Compressive strength (kg/cm$^2$) | 10.3 | 12.5 | 12.6 | 13.1 |
| Bending strength (kg/cm$^2$) | 10 | 12.4 | 10.5 | 3.2 |
| Thermal conductivity (kcal/mh$^0$c) | 0.028 | 0.026 | 0.027 | 0.032 |
| Linear expansion coefficient | 2.3 × 10$^{-6}$ | 2.7 × 10$^{-6}$ | 2.4 × 10$^{-6}$ | 1.8 × 10$^{-6}$ |
| Water absorbing coefficient (vol %) | 1.7 | 1.3 | 1.4 | 1.8 |
| Weatherability (in exposure to atmosphere for one year) | no crack, no degradation in all examples | | | |

We claim:

1. A method of preparing a foamable polyvinyl resin composition suitable for forming nonflammable foamed products having compressive strengths greater than 10 kg/cm$^2$ and densities less than 100 kg/m$^3$, said method comprising the step of reacting (a) polyvinyl chloride resin; (b) at least 0.05 parts by weight organic initiator per 1 part by weight of polyvinyl chloride resin, said organic initiator being selected from the group consisting of azobisalkylnitrile, azobiscyclohexylcarbonitrile, azobisester, phenylazotriphenylmethane, phenylazothiophenylether, phenylazophenylamine, azobisbenzoyl, tetraalkylterazane, 4,4'-azobis-4-cyano valeric acid, dibenzothiazoledisulfide, metal compound of 2-mercapto benzothiazole, N-cyclohexyl-2-benzothiazolysulphenamide, tetraalkylthiuramdisulfide, and metal derivatives of dialkyldithiocarbamic acid; (c) 2-100 parts by weight of at least one inorganic filler per 1 part by weight of polyvinyl chloride resin; and (d) an effective amount of at least one blowing agent.

2. A method of preparing a foamable polyvinyl resin composition as claimed in claim 1, wherein said polyvinyl chloride resin includes at least one member selected from polyvinyl chloride, polyvinylidene chloride, copolymers of the polyvinyl chloride, copolymers of the polyvinylidene chloride, and chlorinated polyethylene.

3. A process for making a vinyl chloride polymer foam suitable for forming nonflammable foamed products having compressive strengths greater than 10 kg/cm$^2$ and densities less than 100 kg/cm$^3$, said process comprising the steps of:
  (1) preparing a composition consisting of:
   (a) a vinyl chloride polymer selected from the group consisting of polyvinyl chloride, polyvinylidene chloride, copolymers of polyvinyl chloride, chlorinated polyethylene;
   (b) 2-100 parts per 1 part of vinyl chloride polymer of at least one inorganic filler;
   (c) a blowing agent; and
   (d) 0.05 parts per 1 part of polymer of an organic radical initiator selected from the group consisting of azobisalkylnitrile, azobiscyclohexylcarbonitrile, azobisester, phenylazotriphenylmethane, phenylazothiophenylether, phenylazophenylamine, azobisbenzoyl, tetraalkylterazane, 4,4'-azobis-4-cyano valeric acid, dibenzothiazoledisulfide, metal compound of 2-mercapto benzothiazole, N-cyclohexyl-2-benzothiazolysulphenamide, tetraalkylthiuramdisulfide, and metal derivatives of dialkyldithiocarbamic acid, and
  (2) blending the composition prepared according to step (1) at elevated temperatures until the temperature of the blend is raised to about 40°-60° C.

* * * * *